June 12, 1962 R. W. KLUGE 3,038,408
COMBINATION ROCKET AND RAM JET POWER PLANT
Filed Oct. 13, 1948 4 Sheets-Sheet 1
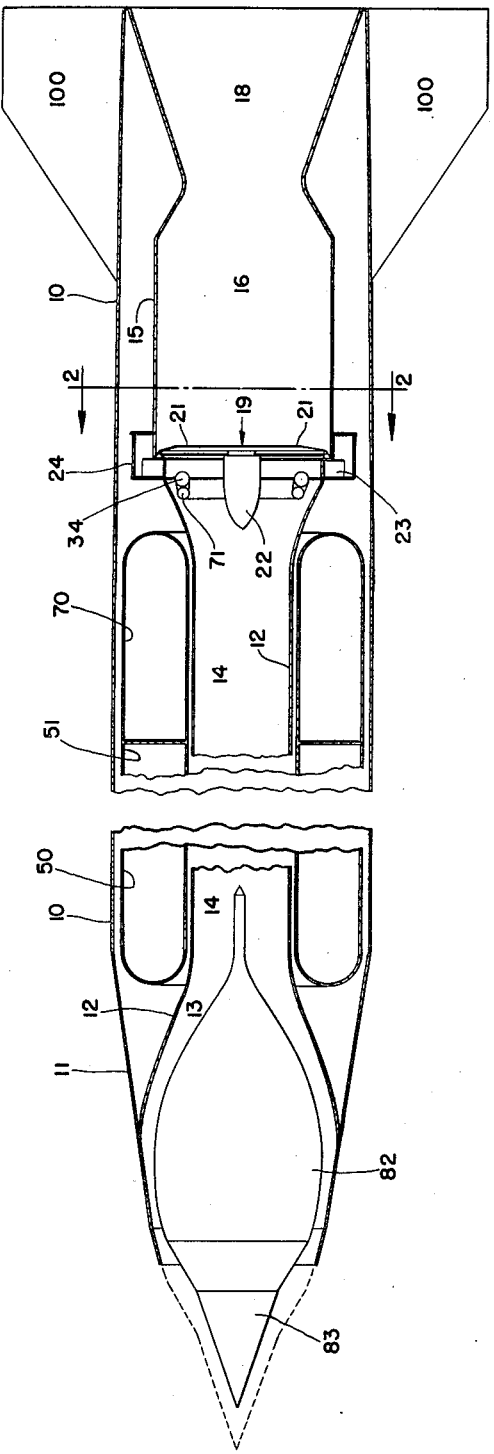
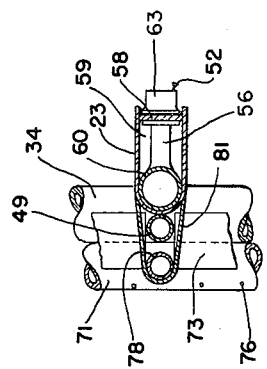
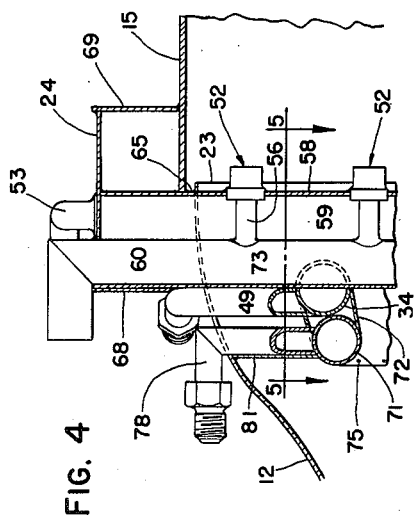
INVENTOR.
ROBERT W. KLUGE
BY Popp and Popp
ATTORNEYS.

June 12, 1962  R. W. KLUGE  3,038,408
COMBINATION ROCKET AND RAM JET POWER PLANT
Filed Oct. 13, 1948  4 Sheets-Sheet 2

INVENTOR.
ROBERT W. KLUGE
BY
Popp and Popp
ATTORNEYS.

INVENTOR.
ROBERT W. KLUGE
BY
Popp and Popp
ATTORNEYS.

June 12, 1962 R. W. KLUGE 3,038,408
COMBINATION ROCKET AND RAM JET POWER PLANT
Filed Oct. 13, 1948 4 Sheets-Sheet 4

INVENTOR.
ROBERT W. KLUGE
BY
Popp and Popp
ATTORNEYS.

United States Patent Office 3,038,408
Patented June 12, 1962

3,038,408
COMBINATION ROCKET AND RAM JET POWER PLANT
Robert W. Kluge, Buffalo, N.Y., assignor to Cornell Aeronautical Laboratory, Inc., Buffalo, N.Y., a corporation of New York
Filed Oct. 13, 1948, Ser. No. 54,247
15 Claims. (Cl. 102—49)

This invention relates to a combination rocket and ram jet power plant, and more particularly to such a power plant as embodied in a missile.

Heretofore, ram jet powered missiles have been launched by a rocket motor device which was jettisoned when the missile had attained a sufficient flight speed to permit the ram jet to operate. The rocket power plant, including its fuel, was entirely independent from the ram jet power plant and had to be nearly the same size as the basic missile.

It is a primary object of the present invention to provide a combination rocket and ram jet power plant in which the same combustion chamber is employed for rocket operation as for ram jet operation.

Another important object is to provide such a power plant which does not require any parts to be jettisoned when changing over from rocket to ram jet operation.

Another important object is to reduce the overall size of rocket boosted ram jet propelled missiles as heretofore constructed, thereby to reduce the storage volume for such a missile.

Another object is to provide such a combination rocket and ram jet power plant which permits the design of a missile which has a higher flight velocity than that of present missiles of this type.

Another object is to provide such an improved missile, the total weight of which at launching is less than that for a similar missile as presently constructed.

Another object is to provide such an improved missile which requires no assembling of parts in preparing it for launching.

Other objects and advantages of the invention will be apparent from the following description and accompanying drawings wherein:

FIG. 1 is a central longitudinal vertical fragmentary sectional view through a missile embodying the present invention.

FIG. 4 is a fragmentary longitudinal sectional view taken on line 4—4, FIG. 2.

FIG. 5 is a fragmentary horizontal longitudinal sectional view taken on line 5—5, FIG. 4.

The invention is shown as embodied in a self-launching ram jet propelled missile. The feature of the invention resides in the utilization of the combustion chamber provided in the missile for ram jet propulsion thereof also as the combustion chamber for rocket operation when the missile is launched. Generally this result is accomplished by closing off the upstream end of the ram jet combustion chamber in order to form a rocket motor for launching the missile and thereafter opening the upstream end of this combustion chamber at the finish of the rocket boost period to allow normal ram jet operation. The fuel components for the rocket portion of the flight are contained within the missile so that no parts need be jettisoned at the end of the boost period.

Figure 2:
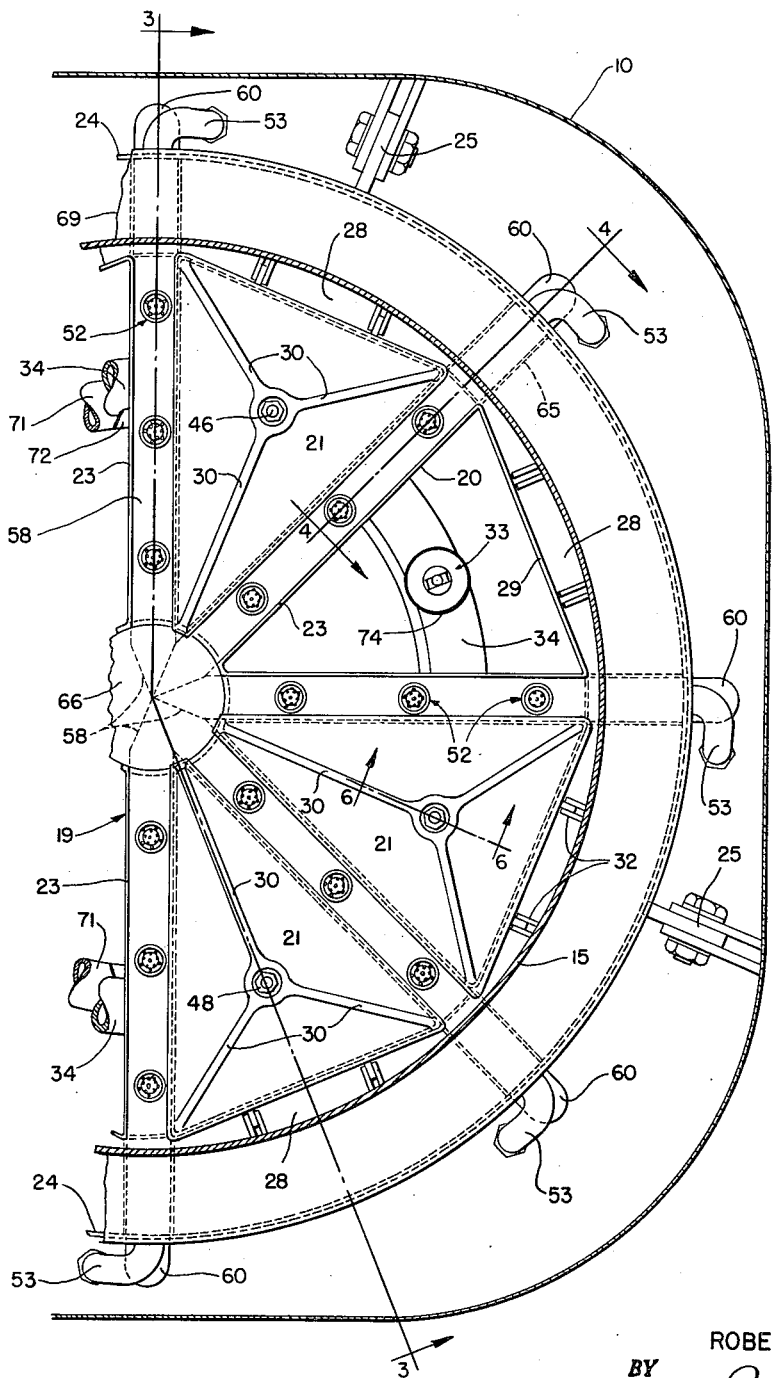
FIG. 2 is a fragmentary vertical transverse sectional view, on an enlarged scale, taken on line 2—2, FIG. 1.

The missile is shown as being in the form of an elongated body having a central axial passage extending completely therethrough from the front end to the rear end of the body. The body of the missile is shown as enclosed by an outer shell 10 which is of square form with rounded corners as shown in FIG. 2, and a tapered front end shell 11 which is of frusto-conical form, the front end of the outer shell 10 merging with the larger and rear end of the front end shell 11 to provide a smoothly contoured exterior for the body. The body is internally formed with a front inner shell 12 to provide an outer duct 13 opening to the front end of the missile body and an inner duct 14 forming a continuation of the outer duct 13. A rear inner shell 15 is arranged within the missile body in rear of the front inner shell 12 to provide a combustion chamber 16 in rear of the rear end of the inner duct 14 and a thrust nozzle 18 connecting with the rear end of the combustion chamber 16 and opening to the rear end of the missile body. The outer duct 13, inner duct 14, combustion chamber 16 and thrust nozzle 18 form the axial through passage in the missile body. The front and rear inner shells 12 and 15, respectively, are circular and tubular in form throughout their lengths. The front end of the front inner shell 12 is larger in diameter than the intermediate portion of this shell and the rear portion thereof gradually enlarges in diameter toward the combustion chamber 16. The front extremity of the front inner shell 12 merges with the front end shell 11 at a place substantially at the middle of this shell 11 as shown in FIG. 1. The portion of the rear inner shell 15 forming the combustion chamber 16 is cylindrical and has a diameter slightly larger than that of the enlarged rear extremity of the front inner shell 12. To form the thrust nozzle 18 the rear portion of the rear inner shell 15 is formed with a gradual reduction in diameter to provide the throat of the thrust nozzle 18 and from this throat section the shell 15 gradually enlarges in diameter toward the rear end of the missile body.

When the missile is launched by rocket propulsion, the upstream end of the combustion chamber 16 is closed off. For this purpose, a frame represented generally by the numeral 19 is shown as arranged between the rear end of the front inner shell 12 and the front end of the rear inner shell 15. This frame 19 is arranged transversely across the axial passage extending through the missile body and is provided with openings 20 adapted to be closed by doors or valves 21.

Figure 3:
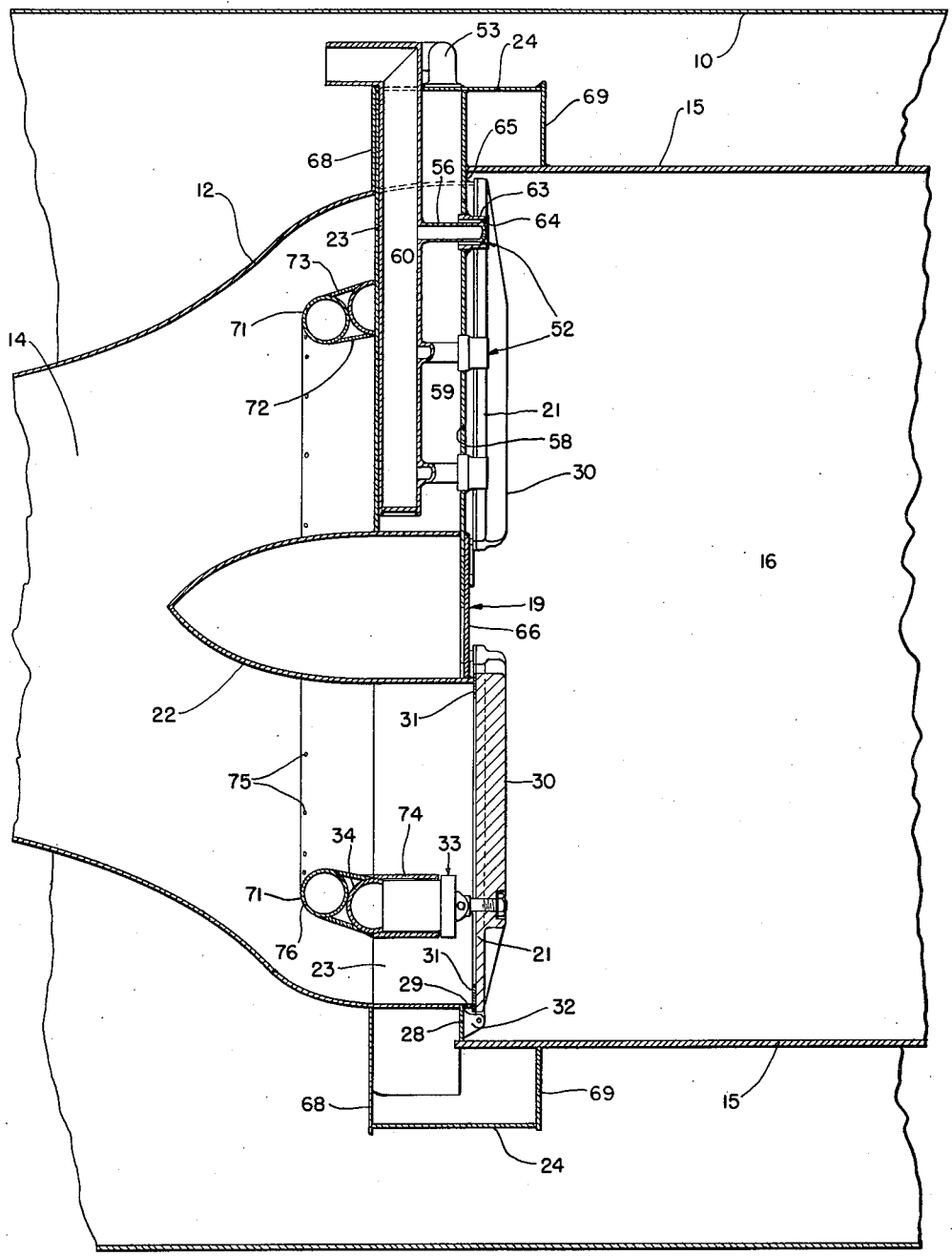
FIG. 3 is a fragmentary longitudinal sectional view taken on line 3—3, FIG. 2.

The frame 19 is shown as including a hollow hub 22 arranged centrally within the axial passage in the missile body from which a plurality of U-shaped troughs 23 project radially outwardly. The inner ends of these troughs 23 are welded to the hub 22 and their outer ends are welded to a cylindrical casing plate 24 which surrounds the opposing ends of the front and rear inner shells 12 and 15, respectively. This casing plate 24 is suitably mounted on the outer shell 10 at circumferentially spaced intervals as indicated at 25. Eight of the U-shaped troughs 23 are shown as arranged at equally spaced circumferential intervals on the hub 22 and each is arranged with its apex facing upstream and with its rear edges in the same transverse plane with the rear edge of the hub 22. The hub 22 is provided with a forwardly projecting bullet shaped nose for streamlining, as shown in FIG. 3.

A segmental plate 28 is arranged on the inside of the rear inner shell 15 between each pair of adjacent troughs 23 and welded in place. Each segmental plate 28 is formed along its inner straight edge with a rearwardly projecting lip 29. The rear end faces of the lips 29 are coplanar with the rear end faces of the sides of the U-shaped trough 23. Therefore, the rear end face of each lip 29 forms a coplanar connection with the rear end faces of the opening sides of each pair of adjacent troughs 23 to form a continuous triangularly shaped seat for one of the doors or valves 21. This continuous triangularly shaped seat surrounds each of the openings 20 as shown in FIG. 2 in which one of the doors or valves 21 is omitted for purposes of illustration.

Each of the doors or valves 21 is of triangular shape in outline and is in the form of a plate having a flat front face and reinforced by integral ribs 30 on its rear to prevent buckling of the plate. These reinforcing ribs 30 are shown as originating at the three corners of the door or valve 21 and extending toward and uniting at the center thereof. The edges of each door or valve 21 are shown as overlapping slightly the triangularly shaped seat previously described. To improve the seal when the doors or valves 21 are closed against their seats, each door is provided with a sealing gasket of soft metal or other suitable sealing material as shown at 31. Each of the doors or valves 21 is hinged along its outer edge and for this purpose a pair of spaced hinges 32 connect the door with its segmental plate 28.

With the doors or valves 21 closed against the frame 19 the axial passage through the missile body is completely closed off and the combustion chamber 16 can be used for rocket propulsion of the missile. However, by opening the doors or valves 21 by swinging them rearwardly on their hinges 32, the openings 20 are thereby uncovered and the combustion chamber 16 can be employed for ram jet operation.

Figure 6:
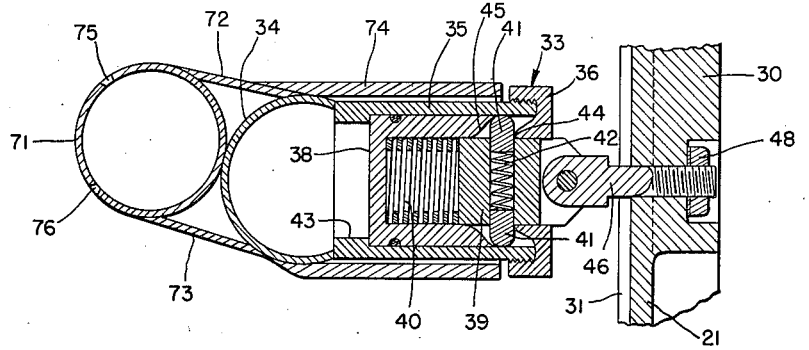
FIG. 6 is a fragmentary longitudinal sectional view, on an enlarged scale, taken on line 6—6, FIG. 2.

Means are provided to normally hold the doors or valves 21 closed and to open them. Such means include a releasable lock 33 for each door or valve 21. These locks 33 are shown as projecting rearwardly from an annular tube 34 which serves as a manifold for a gaseous medium to operate the locks. The annular tube 34 is arranged in the inner air duct 14 on the forward side of the U-shaped troughs 23 and is suitably connected thereto as by welding. A lock 33 projects from this annular tube 34 toward the center of each door or valve 21. Referring particularly to FIG. 6, each of the releasable locks 33 comprises a cylinder 35, end cap 36, cup-shaped piston 38, plunger 39, plunger ejection spring 40, detent pins 41 and detent spring 42. The front end of the cylinder 35 is arranged in an opening provided in the annular tube 34 and is welded to this tube, the axis of this cylinder 35 extending parallel to the longitudinal centeral axis of the missile body. The front end of the cylinder 35 is provided with an opening 43 to establish communication between the interiors of the annular tube 34 and the cylinder 35. The cup-shaped piston 38 is slidably arranged in the bore of the cylinder 35 and is arranged with its head facing the annular tube 34. The plunger 39 is slidably arranged within the bore of the cup-shaped piston 38 and the plunger ejection spring 40 is also arranged in this bore in front of the plunger. The spring 40 is shown in the form of a helically wound spring of flat stock and serves constantly to urge the plunger 39 to move rearwardly relative to the piston 38. This rearward movement or ejection of the plunger 39 from the piston 38 is normally prevented by the pair of detent pins 41 which project outwardly from a slot provided in the plunger 39. The detent spring 42 is also arranged in this slot in the plunger 39 and bears against the inner ends of the detent pins to urge them outwardly. The end cap 36 which is screwed onto the rear end of the cylinder 35 is provided with a central opening through which the plunger 39 projects and the inside of this end cap 36 adjacent its central opening is formed with a forwardly or inwardly projecting lip 44. This end cap lip 44 serves as an abutment against which the outwardly projecting detent pins 41 bear and thereby prevent separation between the plunger 39 and piston 38. The outer ends of the detent pins 41 project outwardly beyond the lip 44 and the outer extremities of these detent pins are rounded and normally engage the bore of the cylinder 35. To cam the detent pins 41 inwardly relative to the plunger 39 the rim or inner end of the cup-shaped piston 38 is formed to provide a smooth and gradually rounded outwardly and rearwardly enlarging cam surface 45. When the piston 38 moves rearwardly its cam surface 45 is adapted to ride over the rounded ends of the detent pins 41 and force them inwardly of the plunger 39 against the urging of the detent spring 42 until the detent pins can no longer be held by the lip 44 on the end cap 36. When this occurs the compressed plunger ejection spring 40 forces the plunger 39 rearwardly out through the opening in the end cap 36.

The plunger 39 of each lock 33 is connected with the adjacent door or valve 21 by means of a rod 46. The front end of this rod 46 is hinged to the rear end of the plunger 39 and the axis of this hinged connection is parallel with the axis of the hinges 32 for the door or valve 21. The rod 46 extends through an opening provided in the center of the door or valve 21 and a nut 48 on the rear end of the rod holds the door on this rod.

Referring again to the releasable lock 33, the opening 43 in the front end of the cylinder 35 is smaller than the bore of this cylinder thereby providing a shoulder against which the marginal portion of the front end of the piston 38 normally bears. This piston 38 is so held by reason of the interposition of the plunger ejection spring 40 between this piston and the plunger 39, the latter in turn being held against movement by the sides of the detent pins 41 abutting against the lip 44 on the end cap 36. Fluid under pressure, such as compressed air, can be introduced into the annular tube 34 through a supply line 49 as shown in FIG. 4. Of course the compressed air is introduced only when it is desired to open the doors or valves 21 and any suitable means for effecting this control can be employed as discussed later herein. When compressed air is admitted into the annular tube 34, this air bears against the front ends of the pistons 38 of the various locks 33 and pushes these pistons rearwardly of their respective cylinders 35 to operate the locks as previously described and thereby forcibly open the doors or valves 21.

When the missile is launched by rocket propulsion the doors or valves 21 are closed and the combustible components must be supplied to the combustion chamber 16. While any suitable combustible components for rocket operation can be employed it is preferred to use liquids such as, for example, octane as the the rocket fuel and concentrated hydrogen peroxide as the oxidizer. However, a combination of white fuming nitric acid and furfuryl alcohol might be substituted and is self-igniting. The rocket fuel is contained within an annular tank 50 surrounding the inner duct 14 and housed between the inner and outer shells 12 and 10, respectively. An annular tank 51 for the oxidizer can be similarly arranged.

The rocket fuel and oxidizer in the tanks 50 and 51, respectively, can be admitted into the combustion chamber 16 in any suitable manner. However, as shown, the liquids are conducted from the tanks 50 and 51 through separate means and injected into the combustion chamber 16 through mixing nozzles 52. Three of these mixing nozzles 52 are shown as arranged on the rear of each of the U-shaped troughs 23.

For supplying the liquid oxidizer, a pipe or tube 60 is shown as arranged within each U-shaped trough 23 and is closed at its inner end. The outer end of each pipe 60 extends through an opening in the cylindrical casing plate 24 and is welded thereto. These pipes 60 are suitably connected with a normally open control valve 61 which in turn is suitably connected with a line 62 leading to the oxidizer supply tank 51. A series of three radially spaced delivery tubes 56 project rearwardly from each of the pipes 60. The outer end of each of these delivery tubes 56 is perforated to permit the liquid oxidizer to be discharged or sprayed therethrough, and forms part of one of the spray nozzles 52.

The liquid rocket fuel is supplied to the interior of each of the U-shaped troughs 23 in rear of the oxidizer pipes 60. The open and rear end of each U-shaped trough 23 is closed off by a wall member 58 thereby forming an enclosed chamber 59 defined and enclosed by the wall 58, the parallel side walls of the U-shaped trough 23, the rear half of the oxidizer pipe 60 and the wall of the hub 22. Liquid rocket fuel is admitted to each of these chambers 59 so formed by a supply line or tube 53 which extends through an opening in the cylindrical casing plate 24. The supply lines 53 are suitably connected with a normally open control valve 54 which in turn is suitably connected with a line 55 leading to the rocket fuel supply tank 50.

A short tube or sleeve 63 forming a part of one of the mixing nozzles 52 is arranged in an opening in the corresponding wall 58 and is welded thereto and surrounds the outer end of the corresponding rocket fuel delivery tube 56 in radially spaced relation thereto. The inner end of each of these sleeves 63 opens to the respective chamber 59 and a perforated wall 64 is arranged in the annular space between the outer or rear ends of the sleeve 63 and corresponding tube 56. Therefore liquid rocket fuel can be discharged or sprayed through the perforated wall 64 to mix with the liquid oxidizer discharged or sprayed through the perforated end of the corresponding delivery tube 56. The combinative discharge of the liquid combustible components into the combustion chamber 16 operates the rocket motor.

As best shown in FIG. 5, each of the walls 58 enclosing the open and rear end of the corresponding U-shaped trough 23 is recessed inwardly of the trough from the rear end faces thereof so as to avoid interference with the seating of the corresponding door or valve 21. In this connection the side walls of the U-shaped trough 23 are undercut along their rear edges as indicated at 65, beginning at the corners of the adjacent segmental members 28 and extending outwardly to the cylindrical casing plate 24. The walls 58 are coplanar with the transverse parts of the segmental members 28 and are joined thereto where they meet adjacent the undercuts 65. Each wall 58 is in the form of a sheet metal strip, the inner ends of which are pointed and join as shown by broken lines in FIG. 2. The walls 58 are arranged in accommodating notches or cut-outs formed in the rear end of the wall of the hollow hub 22. A cover plate 66 in the form of a disk is arranged on the rear of the joined inner ends of the walls 58 and closes off the rear end of the hollow hub 22, this cover plate being welded to the hub.

The space between the front end of the cylindrical casing plate 24 and the front inner shell 12 is closed off by an annular plate 68 welded to these members. A similar annular plate 69 is arranged between the rear end of the cylindrical casing plate 24 and the rear inner shell 15. Thus the plates 68, 24 and 69 form a box or enclosure for the joint between the front and rear inner shells 12 and 15, respectively.

When the missile is propelled by ram jet operation, the doors or valves 21 are open to permit air entering the central axial passage in the missile body, in response to the movement of the missile, to develop a sufficient pressure in the combustion chamber 16 to combust a fuel which is admitted to the combustion chamber. While any suitable ram jet fuel can be employed it is preferred to use a liquid such as, for example, octane. The ram jet fuel is contained within an annular tank 70 surrounding the inner duct 14 and housed between the inner and outer shells 12 and 10, respectively.

The ram jet fuel in the tank 70 can be admitted into the combustion chamber 16 in any suitable manner. As shown, this is accomplished by the provision of an annular tube 71 of approximately the same size as the annular tube 34 and arranged immediately in advance thereof. The annular tube 71 is mounted on the adjacent tube 34 by the inner and outer fairing rings 72, 73, respectively, the front and rear edges of which are welded to these tubes so as to provide a smooth external surface. As shown in FIG. 6, the main portion of the cylinder 35 of each releasable lock 33 is surrounded by a fairing sleeve 74 which has its front end suitably formed to permit the sleeve to be welded at its top and bottom to the fairing rings 72 and 73, respectively, and along its sides to the annular tube 34. In this manner the annular structure so formed is streamlined.

The rounded and exposed front side of the annular tube 71 is provided with inner and outer series of annularly spaced openings or ports 75 and 76, respectively, through which the liquid ram jet fuel can be discharged into the air stream passing around both sides of the annular tube 71 and flowing toward the combustion chamber 16. Thus this tube 71 serves as a manifold for the liquid ram jet fuel which is supplied thereto by a supply line 78. This supply line 78 at its opposite end is connected with a normally closed control valve 79 which in turn is connected to a line 80 leading to the ram jet fuel tank 70.

Referring to FIGS. 4 and 5, the supply lines 78 and 49 for the annular tubes 71 and 34, respectively, are parallel, with the line 78 arranged in front of the line 49. These supply lines 78 and 49 are also arranged in front of and parallel with one of the U-shaped troughs 23. The outer fairing ring 73 is split or cut out to permit the supply lines 78 and 49 to project radially outwardly therefrom. To provide a streamlined exterior contour for the supply lines 78 and 49, a U-shaped fairing 81 is wrapped around these lines with its rear edges welded to the sides of the U-shaped trough 23, with its inner edge welded to the annular tubes 71 and 34 and outer fairing ring 73, and with its outer edge welded to the front inner shell 12.

The missile is shown as provided with a warhead 82 containing any suitable explosive and in FIG. 1 is shown in elevation and arranged centrally within the outerduct 13 in uniformly spaced relation to the surrounding frustoconical and front inner shells 11 and 12, respectively, in any transverse plane. The front end of the warhead 82 carries a forwardly projecting diffuser cone 83 which extends forwardly beyond the leading edge of the frustoconical shell 11. It is desirable to prevent a normal shock from forming in front of the missile during the launching period in order to avoid paying a serious penalty in rocket fuel consumption due to drag. To eliminate this problem, the warhead 82 and the diffuser cone 83, which forms a part of the multi-shock diffuser, is suitably mounted for limited axial movement relative to the missile body so that the entrance to the axial passage extending through the missile is completely closed off or plugged during the launching period, thus presenting a streamlined shape to the air. The launching position of the diffuser cone 83 is shown by broken lines in FIG. 1 and the solid line representation of this cone 83 shows its flight position when the missile is ram jet propelled.

When the missile is in flight and it is desired to open the entrance to the outer duct 13 in order to change over to ram jet operation, it is necessary to forcibly retract the warhead 82 and diffuser cone 83 since they will tend to remain in their forward closed position. This can be accomplished in any suitable manner such as by springs (not shown) which constantly urge the warhead 82 and diffuser cone 83 to a retracted position, the warhead and diffuser cone being held in a forward or launching position by a releasable lock or locks (not shown) similar to the releasable lock 33. Thus the releasable lock or locks (not shown) for the warhead 82 and diffuser cone 83 can be pneumatically operated as in the case of the releasable locks 33 and when released the spring loaded warhead and diffuser cone would move inwardly of the outer duct 13 thereby to provided an entrance or air inlet into the duct 13.

Figure 7:
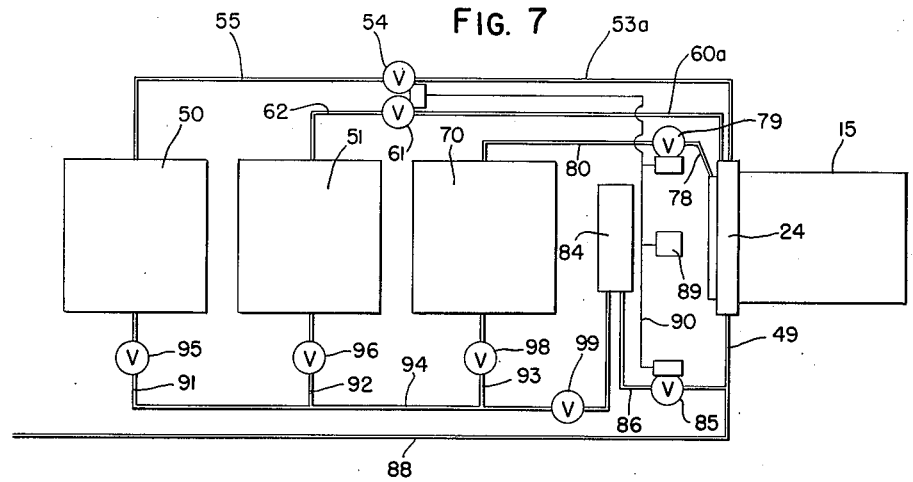
FIG. 7 is a diagram of the pressurized fuel supply and control system for successively operating the rocket and ram jet motors.

Any suitable means for providing a gas under pressure to operate pneumatic devices and effect the distribution of fuel components can be employed. Thus, mechanical pumps or chemically induced pressure generating systems can be employed. However, as shown in FIG. 7, a presurized gas, such as compressed air, for operating the releasable locks 33 for the doors or valves 21 and the similar releasable lock or locks (not shown) for the warhead 82 and diffuser cone 83, can be supplied from a pressure tank 84 containing the compressed air. As well, the compressed air in this tank 84 can pressurize the liquids in the tanks 50, 51 and 70. The pressure tank 84 or other substitute pressure generating device is suitably housed wtihin the missile body.

In the diagrammatiically illustrated pressurized control and fuel distribution system shown in FIG. 7, the supply line 49 connected with the annular tube 34 is connected with a normally closed control valve 85 and a line 86 connects this valve with the pressure tank 84. A control line 88 connects the releasable lock or locks (not shown) for the warhead 82 and diffuser cone 83, with the supply line 49. Thus when the control valve 85 is closed the doors or valves 21 are held closed and the warhead 82 and diffuser cone 83 are in their launcher position in which the front entrance to the missile is closed. However, when the control valve 85 is opened, compressed air is admitted to the lines 49 and 88 thereby to retract the warhead 82 and diffuser cone 83 and open the doors or valves 21.

The opening of the normally closed control valve 85 is under the control of any suitable actuating device 89, such as a timing device to operate at a predetermined interval after the launching of the missile or a device operable when the missile attains a given speed in flight. Persons skilled in the art are familiar with such devices. The normally closed ram jet fuel control valve 79, the normally open rocket fuel control valve 54 and the normally open oxidizer control valve 61 are also operatively associated with the actuating device 89. The operative connection of the various control valves 85, 79, 54 and 61 with the actuating device 89 is diagrammatically represented by the line 90.

The tanks 50, 51 and 70 are shown as connected by branch lines 91, 92 and 93, respectively, with a main line 94 connecting with the pressure tank 84. The branch lines 91, 92 and 93 have arranged therein constant pressure valves 95, 96 and 98, respectively. A normally closed trigger valve 99 is arranged in the main line 94 between the branch line 93 and the pressure tank 84.

The individual rocket fuel supply pipes 53 are collectively represented in the diagram, FIG. 7, by the line 53a. Also, in this figure, the individual oxidizer supply lines 60 are collectively represented by the line 60a.

The missile is also provided with tail fins 100 and wings (not shown) which can either be adjusted in a prefixed position prior to launching or can be remote controlled. If remote controlled, suitable control and guidance equipment (not shown) can be arranged in a compartment in the missile body.

Operation

To launch the missile it is placed on a suitable launching support. In the firing or launching position the doors or valves 21 are closed and so held by the locks 33 and the warhead 82 and diffuser cone 83 are in their forward position, indicated by broken lines in FIG. 1, closing off the entrance to the axial passage extending through the missile. At this time, the pressure tank 84 contains its change of compressed air and the trigger control valve 99 is closed so that the liquids in the tanks 50, 51 and 70 are not under pressure. Further, the compressed air control valve 85 is in its normal and closed position, as is also the ram jet fuel control valve 79, and the rocket fuel control valve 54 and the rocket oxidizer control valve 61 are in their normal and open positions.

In this condition the missile is fired or launched by opening the trigger control valve 99, this valve being accessibly arranged for this purpose. Opening this valve 99 permits compressed air in the pressure tank 84 to flow through the main line 94, through the branch lines 91, 92 and 93 and past the constant pressure valves 95, 96 and 98 into the tanks 50, 51 and 70. In so placing the liquids in the tanks 50, 51 and 70 under pressure, the ram jet fuel cannot be forced out of the tank 70 since its control valve 79 is closed. However, since the control valves 54, 61 are open rocket fuel and oxidizer can be forced out of the tanks 50 and 51. Thus, rocket fuel flows from the tank 50 through the line 55, past the open valve 54, into the various supply pipes 53 (lines 53a in FIG. 7), into the enclosed chambers 59, through the annular spaces between the companion nozzles sleeves 63 and delivery tubes 56 of the various mixing nozzles 52, and through the perforated walls 64 into the combustion chamber 16. Concurrently, rocket oxidizer flows from the tank 51 through the line 62, past the open valve 61, through the various supply pipes 60 (line 60a in FIG. 7), through the delivery tubes 56 and into the combustion chamber 16. The liquids so admitted to the combustion chamber 16 either are self-igniting or are ignited by an igniter (not shown). Upon the ignition of the rocket fuel and oxidizer in the combustion chamber 16, the pressurized gases developed are exhausted through the thrust nozzle 18 thereby to exert a forward thrust on the missile. In this manner the missile is launched by rocket propulsion.

The missile accelerates in flight as the rocket motor is operated and at a predetermined speed sufficient for ram jet operation the actuating device 89 operates, substantially simultaeously, to open the compressed air control valve 85, to open the ram jet fuel control valve 79, to close the rocket fuel control valve 54, and to close the rocket oxidizer control valve 61. Closing the rocket fuel and oxidizer control valves 54 and 61, respectively, cuts off the supply of these combustible components to the mixing nozzles 52.

When the compressed air control valve 85 is open, compressed air from the pressure tank 84 passes through the line 86, past the now open control valve 85 and through the lines 49 and 88. The compressed air in the line 49 is conducted to the annular tube or manifold 34 and the various locks 33 are operated by the compressed air to release and open the doors or valves 21, as previously described hereinabove. Substantially concurrently with the opening of the doors or valves 21, the warhead 82 and diffuser cone 83 are operatively released by the compressed air in the line 88 and move rearwardly a limited distance into the outer duct 13 thereby to open the front end of this duct. Due to the forward movement of the missile air rushes into the entrance to the duct 13, passing around the diffuser cone 83 and warhead 82, through the inner duct 14, past both sides of the annular tube 71, through the now uncovered openings 20 in the frame 19 and into the combustion chamber 16. The formation of the outer duct 13, inner duct 14 and combustion chamber 16 is such as to compress the air and raise its temperature.

Opening the ram jet fuel control valve 79 permits ram jet fuel to flow from the tank 70 through the line 80, past the now open control valve 79, through the supply line 78 and into the annular tube 71, and through the openings 75 and 76 into the passing air stream. Thus ram jet fuel is discharged into compressed and heated air and is combusted thereby in the combustion chamber 16. As in the case of rocket operation, the products of combustion of the ignited ram jet fuel are exhausted through the thrust nozzle 18 and thereby propel the missile. The heated combustion chamber wall resulting from the rocket operation aids in igniting the ram jet fuel and compressed air mixture.

The choice of the design velocity for the missile is dependent on several considerations. The lower limit for the initial velocity is set by the configuration of the combustion chamber. In order to achieve good liquid rocket combustion efficiency, a combustion chamber cross-sectional area larger than the throat cross-sectional area, with the exit area approximately four times the throat area, is preferred. In order to make a ram jet combustion chamber fit this same geometry, the initial velocity for ram jet operation must in general exceed Mach number 2.5. The upper velocity limit for operation is governed chiefly by the strength of the materials employed in the missile structure, an important factor affecting material strength being the temperature thereof developed due to skin friction. Velocities higher than Mach number 2.5, from the standpoint of ram jet operation, advantageously affect ignition, aid combustion, increase altitude of operation and provide better fuel economy. From the missile standpoint, the higher velocities reduce the time of interception of targets when operating as a ram jet, and thereby decrease the length of time that parts such as the combustion chamber wall need be subjected to the destructive effect of high temperatures.

The missile described herein has practical, tactical, and simplification advantages over existing missiles and their launching systems.

While the combination rocket and ram jet power plant has been described as embodied in a missile, it will be understood that the invention is not so limited and the power plant can be embodied in any suitable type of missile, projectile, craft or body capable of free flight.

I claim:

1. A combination rocket and ram jet power plant, comprising a body having a passage extending completely therethrough, said passage including an air duct, a thrust nozzle and a combustion chamber arranged between said air duct and thrust nozzle, movable means arranged to close off said passage at the upstream end of said combustion chamber and movable to open said passage, means arranged to introduce combustible components into said combustion chamber when said passage is closed for rocket propulsion of said body, and separate means arranged to introduce fuel into said combustion chamber when said passage is open for ram jet propulsion of said body.

2. A combination rocket and ram jet power plant, comprising a body having a passage extending completely therethrough, said passage including an air duct, a thrust nozzle and a combustion chamber arranged between said air duct and thrust nozzle, a frame connected to said body and arranged across said passage at the upstream end of said combustion chamber and having openings therein establishing communication between said air duct and combustion chamber, doors arranged on the downstream side of said frame and hinged thereon and fitted against said frame to close said openings, releasable means holding said doors in a closed position against said frame, means arranged to operate said releasable means to swing said doors about their hinges away from said frame and thereby uncover said openings, and means arranged to introduce fuel into said combustion chamber for rocket propulsion of said body when said doors are closed and for ram jet propulsion of said body when said doors are open.

3. A combination rocket and ram jet power plant, comprising a body having a passage extending completely therethrough, said passage including an air duct, a thrust nozzle and a combustion chamber arranged between said air duct and thrust nozzle, a frame connected to said body and arranged across said passage at the upstream end of said combustion chamber and having a plurality of triangularly shaped openings therein establishing communication between said air duct and combustion chamber, a triangularly shaped door covering each of said openings and arranged on the downstream side of said frame and fitting thereagainst, means hinging the outer edge of each of said doors on said frame, releasable means arranged on the upstream side of said doors and holding said doors in a closed position against said frame, means arranged to operate said releasable means to swing said doors rearwardly and outwardly about their hinges away from said frame and thereby uncover said openings, and means arranged to introduce fuel into said combustion chamber for rocket propulsion of said body when said doors are closed and for ram jet propulsion of said body when said doors are open.

4. A combination rocket and ram jet power plant, comprising a body having a passage extending completely therethrough, said passage including an air duct opening to the front of said body, a thrust nozzle opening to the rear of said body and a combustion chamber arranged between said air duct and thrust nozzle, a first movable means arranged at the upstream end of said combustion chamber and closing off said passage and movable to open said passage, a second movable means arranged at the upstream end of said air duct and closing off the entrance to said passage and movable to open said entrance, and means arranged to introduce fuel into said combustion chamber, said first and second movable means closing off said passage when the power plant is being operated as a rocket motor and opening said passage when the power plant is being operated as a ram jet motor.

5. A combination rocket and ram jet power plant, comprising a body having a passage extending completely therethrough, said passage including an air duct opening to the front of said body, a thrust nozzle opening to the rear of said body and a combustion chamber arranged between said air duct and thrust nozzle, a frame connected to said body and arranged across said passage at the upstream end of said combustion chamber and having openings therein establishing communication between said air duct and combustion chamber, movable members closing said openings and movable to uncover said openings, a movable plug arranged at the front end of said air duct and closing the upstream entrance thereto and movable rearwardly a limited distance to open said entrance, and means arranged to introduce fuel into said combustion chamber, said movable members and plug closing off said passage and entrance respectively when the power plant is being operated as a rocket motor and opening said passage and entrance respectively when the power plant is being operated as a ram jet motor.

6. A combination rocket and ram jet power plant, comprising a body having a passage extending completely therethrough, said passage including an air duct, a thrust nozzle and a combustion chamber arranged between said air duct and thrust nozzle, a frame connected to said body and arranged across said passage at the upstream end of said combustion chamber and having openings therein establishing communication between said air duct and combustion chamber, movable members closing said openings and movable rearwardly to uncover said openings, means arranged to introduce fuel into said combustion chamber when said openings are closed for rocket propulsion of said body, and means arranged on the upstream side of said frame to introduce fuel into the air stream flowing toward said combustion chamber when said openings are uncovered for ram jet propulsion of said body.

7. A combination rocket and ram jet power plant, comprising a body having a passage extending completely therethrough, said passage including an air duct, a thrust nozzle and a combustion chamber arranged between said air duct and thrust nozzle, a frame connected to said body and arranged across said passage at the upstream end of said combustion chamber and having openings therein establishing communication between said air duct and combustion chamber, movable members closing said openings and movable rearwardly to uncover said openings, fuel nozzles arranged on the downstream side of said frame to introduce fuel into said combustion chamber when said openings are closed for rocket propulsion of said body, an annular tube arranged on the upstream side of said frame and having ports therein to introduce fuel into the air stream flowing toward said combustion chamber when said openings are uncovered for ram jet propulsion of said body.

8. A combination rocket and ram jet power plant, comprising a body having a passage extending completely therethrough, said passage including an air duct, a thrust nozzle and a combustion chamber arranged between said air duct and thrust nozzle, a frame connected to said body and arranged across said passage at the upstream end of said combustion chamber and having a plurality of triangularly shaped openings therein establishing communication between said air duct and combustion chamber, a triangularly shaped door covering each of said openings and arranged on the downstream side of said frame and fitting thereagainst, means hinging the outer edge of each of said doors on said frame, releasable means arranged to hold said doors in a closed position against said frame and releasable to permit said doors to swing rearwardly and outwardly about their hinges away from said frame and thereby uncover said openings, fuel nozzles arranged on the downstream side of said frame between said doors to introduce fuel into said combustion chamber when said openings are closed for rocket propulsion of said body, and an annular tube arranged opposite said openings on the upstream side of said frame and having ports therein to introduce fuel into the air stream flowing toward said combustion chamber when said openings are uncovered for ram jet propulsion of said body.

9. A combination rocket and ram jet power plant, comprising a body having a passage extending completely therethrough, said passage including an air duct, a thrust nozzle and a combustion chamber arranged between said air duct and thrust nozzle, a frame connected to said body and arranged across said passage at the upstream end of said combustion chamber and having a plurality of triangularly shaped openings therein establishing communication between said air duct and combustion chamber, a triangularly shaped door covering each of said openings and arranged on the downstream side of said frame and fitting thereagainst, means hinging the outer edge of each of said doors on said frame, an annular tube arranged opposite said openings on the upstream side of said frame, a releasable lock mounted on the downstream side of said tube opposite each of said doors and connected thereto and holding the door to which it is connected in a closed position against said frame, said releasable locks being operable to release said doors and permit them to swing rearwardly and outwardly about their hinges away from said frame and thereby uncover said openings, each of said locks being arranged to be released by pressurized fluid in said tube, means arranged to introduce said pressurized fluid into said tube to release said locks, and means arranged to introduce fuel into said combustion chamber for rocket propulsion of said body when said doors are closed and for ram jet propulsion of said body when said doors are open.

10. A combination rocket and ram jet power plant, comprising a body having a passage extending completely therethrough, said passage including an air duct, a thrust nozzle and a combustion chamber arranged between said air duct and thrust nozzle, a frame connected to said body and arranged across said passage at the upstream end of said combustion chamber and having a plurality of triangularly shaped openings therein establishing communication between said air duct and combustion chamber, a triangularly shaped door covering each of said openings and arranged on the downstream side of said frame and fitting thereagainst, means hinging the outer edge of each of said doors on said frame, a first annular tube arranged opposite said openings and mounted on said frame on the upstream side thereof, a releasable lock operatively interposed between each of said doors and said first tube and holding the door in a closed position against said frame, said releasable locks being operable to release said doors and permit them to swing rearwardly and outwardly about their hinges away from said frame and thereby uncover said openings, each of said locks being arranged to be released by pressurized fluid in said first tube, means arranged to introduce said pressurized fluid into said tube to release said locks, fuel nozzles arranged on the downstream side of said frame between said doors to introduce fuel into said combustion chamber when said openings are closed for rocket propulsion of said body, and a second annular tube arranged on the upstream side of said first annular tube and connected thereto and having ports therein to introduce fuel into the air stream flowing toward said combustion chamber when said openings are uncovered for ram jet propulsion of said body.

11. A combination rocket and ram jet power plant, comprising a body having a passage extending completely therethrough, said passage including an air duct, a thrust nozzle and a combustion chamber arranged between said air duct and thrust nozzle, movable means arranged to close off said passage at the upstream end of said combustion chamber and movable to open said passage, a first tank arranged within said body for liquid rocket fuel, a second tank arranged within said body for liquid oxidizer, a third tank arranged within said body for liquid ram jet fuel, means arranged to introduce said liquid rocket fuel and oxidizer from said first and second tanks into said combustion chamber when said passage is closed off by said movable means for rocket propulsion of said body, and means arranged to introduce said liquid ram jet fuel from said third tank into the air stream flowing toward said combustion chamber when said passage is opened by said movable means for ram jet propulsion of said body.

12. A combination rocket and ram jet power plant, comprising a body having a passage extending completely therethrough, said passage including an air duct, a thrust nozzle and a combustion chamber arranged between said air duct and thrust nozzle, a frame connected to said body and arranged across said passage at the upstream end of said combustion chamber and having openings therein establishing communication between said air duct and combustion chamber, movable members closing said openings and movable to uncover said openings, a first tank arranged within said body for liquid rocket fuel, a second tank arranged within said body for liquid oxidizer, a third tank arranged within said body for liquid ram jet fuel, fluid discharge means arranged on said frame on the downstream side thereof and communicable with said first and second tanks for introducing said liquid rocket fuel and oxidizer into said combustion chamber when said passage is closed off by said movable members for rocket propulsion of said body, and fluid discharge means arranged on said frame on the upstream side thereof and communicable with said third tank for introducing said liquid ram jet fuel into the air stream flowing toward said combustion chamber when said passage is opened by said movable members for ram jet propulsion of said body.

13. A combination rocket and ram jet power plant, comprising a body having a passage extending completely therethrough, said passage including an air duct, a thrust nozzle and a combustion chamber arranged between said air duct and thrust nozzle, a frame connected to said body and arranged across said passage at the upstream end of said combustion chamber and having a plurality of triangularly shaped openings therein establishing communication between said air duct and combustion chamber, a triangularly shaped door covering each of said openings and arranged on the downstream side of said frame and fitting thereagainst, means hinging the outer edge of each of said doors on said frame, a first annular tube arranged opposite said openings, and mounted on said frame on the upstream side thereof, a releasable lock operatively interposed between each of said doors and said first tube and holding the door in a closed position against said frame, said releasable locks being operable to release said doors and permit them to swing rearwardly and outwardly about their hinges away from said frame and thereby uncover said openings, each of said locks being arranged to be released by pressurized fluid in said first tube, means arranged to introduce said pressurized fluid into said tube to release said locks, a first tank arranged within said body for liquid rocket fuel, a second tank arranged within said body for liquid oxidizer, mixing nozzles arranged on the downstream side of said frame for discharging said liquid rocket fuel and oxidizer into said combustion chamber, means arranged to supply said liquid rocket fuel and oxidizer from said first and second tanks to said mixing nozzles when said doors are closed for rocket propulsion of said body, a third tank arranged within said body for liquid ram jet fuel, a second annular tube mounted on the upstream side of said first annular tube and having ports therein for discharging said liquid ram jet fuel into the air stream flowing toward said combustion chamber, and means arranged to supply said liquid ram jet fuel from said third tank to said second annular tube when said doors are opened for ram jet propulsion of said body.

14. A combination rocket and ram jet power plant comprising a body having a passage extending completely therethrough, said passage including an air duct, a thrust nozzle and a combustion chamber arranged between said air duct and thrust nozzle, a frame connected to said body and arranged across said passage at the upstream end of said combustion chamber and having openings therein establishing communication between said air duct and combustion chamber, movable members closing said openings, means arranged to move said movable members to uncover said openings, means arranged to introduce liquid rocket fuel and oxidizer into said combustion chamber for rocket propulsion of said body, means arranged to introduce liquid ram jet fuel into said combustion chamber for ram jet propulsion of said body, and means arranged to stop the introduction of said liquid rocket fuel and oxidizer and to effect the introduction of said liquid ram jet fuel when said movable members are moved to uncover said openings whereby the power plant changes over from operation as a rocket motor to operation as a ram jet motor.

15. A self-launching missile, comprising an elongated body having a passage extending axially completely therethrough, said passage including an air duct opening to the front of said body, a thrust nozzle opening to the rear of said body and a combustion chamber arranged between said air duct and thrust nozzle, a frame connected to said body and arranged across said passage at the upstream end of said combustion chamber and having openings therein establishing communication between said air duct and combustion chamber, movable members closing said openings and movable to uncover said openings, a movable warhead closing off the front end of said air duct and movable to open said air duct, means arranged to introduce liquid rocket fuel and oxidizer into said combustion chamber for rocket propulsion of said missile, means arranged to introduce liquid ram jet fuel into the air stream flowing toward said combustion chamber for ram jet propulsion of said body, and means arranged to stop the introduction of said liquid rocket fuel and oxidizer and to effect the introduction of said liquid ram jet fuel when said movable members and movable warhead are moved to open said passageway whereby the power plant changes over from operation as a rocket motor to operation as a ram jet motor.

References Cited in the file of this patent
UNITED STATES PATENTS
2,446,266    Cummings _____ Aug. 3, 1948